United States Patent Office 3,494,961
Patented Feb. 10, 1970

3,494,961
1,4-BIS-[p-(DIALKYLAMINOALKOXY)ARYL]-1,4-
BIS-(ARYL)-2-B-1,4-DIOLS
Rudolf Ruegg, Bottmingen, Gottlieb Ryser, Basel, and
Ulrich Schwieter, Reinach, Switzerland, assignors to
Hoffmann-La Roche Inc., Nutley, N.J., a corporation of
New Jersey
No Drawing. Continuation-in-part of applications Ser. No.
530,790, Mar. 1, 1966, and Ser. No. 561,709, June 30,
1966. This application June 27, 1967, Ser. No. 649,093
Claims priority, application Switzerland, Mar. 12, 1965,
3,494/65; June 30, 1966, 9,503/66; Sept. 27, 1966,
14,022/66
Int. Cl. C07c 91/40; A61k 27/00
U.S. Cl. 260—570
10 Claims

ABSTRACT OF THE DISCLOSURE 1,4 - bis(dialkylaminoalkoxyaryl) - 1,4 - bis(substituted phenyl)-2 - butyne - 1,4-diols having anthelmintic properties are prepared by condensing an acetylide with the appropriately substituted benzophenones. p-Halo-p'-dialkylaminoalkoxy benzophenone derivatives and p-nitro-p'-dialkylaminoalkoxy benzophenone derivatives which are employed as intermediates were also found to possess antitubercular properties. Alternative processes for the preparation of the benzophenone intermediates are also given.

CROSS REFERENCE TO RELATED APPLICATIONS

This application is a continuation-in-part of Ser. No. 530,790, Ruegg, Ryser and Schweiter, filed Mar. 1, 1966, now abandoned, and a continuation-in-part of Ser. No. 561,709, Ruegg, Rysor and Schweiter, filed June 30, 1966, now abandoned.

BRIEF DESCRIPTION OF THE INVENTION

This invention relates to novel acetylene compounds which are useful as anthelmintic agents and to processes for the preparation thereof. The invention also relates to novel benzophenone derivatives which are useful as intermediates in the preparation of said acetylene compounds and to processes for the preparation of the benzophenone intermediates which are also useful as anti-tubercular agents. More particularly, the invention pertains to novel acetylene compounds of the formula

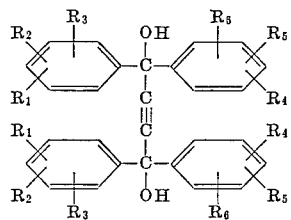

(I)

wherein $R_1$ represents (di-lower alkyl amino)-lower alkoxy; $R_2$, $R_3$ and $R_4$ are each independently selected from the group consisting of hydrogen, lower alkyl and halogen; $R_5$ represents hydrogen, lower alkyl, lower alkoxy, halogen, nitro or di-lower alkyl amino; and $R_6$ represents hydrogen, lower alkyl, lower alkoxy, halogen, nitro, di-lower alkyl amino (di-lower alkyl amino)-lower alkoxy, (N-lower alkyl-N-lower alkenyl-amino)-lower alkoxy or acceptable acid addition salts thereof and to processes for the preparation thereof.

The invention also relates to novel benzophenone derivatives of the formula

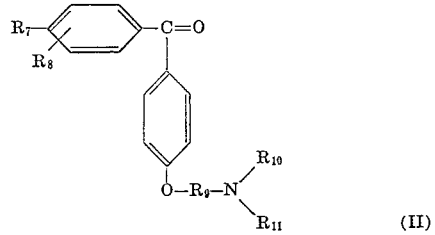

(II)

wherein $R_7$ is bromo, iodo or nitro; $R_8$ is hydrogen or halogen; each of $R_{10}$ and $R_{11}$ is independently lower alkyl or lower alkenyl; and $R_9$ is lower alkylene or pharmaceutically acceptable salts thereof and to processes for the preparation thereof.

DETAILED DESCRIPTION OF THE INVENTION

In one of its specific product aspects this invention relates to novel acetylene compounds for Formula I above. The novel acetylene compounds according to the broad process aspect of this invention are prepared by reacting a benzophenone derivative of the formula

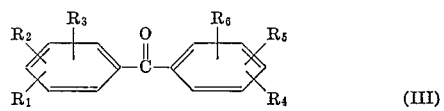

(III)

wherein $R_1$–$R_6$ have the same meaning as hereinabove with an organo metallic acetylene derivative.

As used herein the term "lower alkyl" denotes a straight or branched chain saturated hydrocarbon containing from 1–7 carbon atoms, e.g. methyl, ethyl, propyl, isopropyl, butyl, isobutyl, t-butyl and the like. The term "lower alkenyl" denotes an ethylenically unsaturated straight or branched chain hydrocarbon containing 2–7 carbon atoms, such as 2-propenyl, 2-butenyl, 3-butenyl and the like. The term "lower alkoxy" denotes alkoxy groups 1–7 carbon atoms, such as methoxy, ethoxy, propoxy, isopropoxy, butoxy and the like. The term "halogen" denotes all four halogens, viz. bromine, chlorine, fluorine and iodine. Chlorine and bromine are preferred. The term "di-lower alkyl amino" denotes a tertiary alkyl amino group in which the alkyl substituent can be the same or different, e.g. dimethylamino, diethylamino, di-n-propylamino and the like. The term "lower alkylene" denotes a straight or branched chain saturated alkylene radical containing 2–7 carbon atoms, e.g. ethylene, propylene, isopropylene, butylene, isobutylene, pentylene and the like.

Illustrative of the products of Formula I which can be prepared according to this invention are the following:

1,4-bis-[p-(diethylamino-ethoxy)-m-tolyl]-1,4-bis-(m-chlorophenyl)-2-butyne-1,4-diol
1,4-bis-[p-(diethylamino-ethoxy)-phenyl]-1,4-bis-(m-chloro-phenyl)-2-butyne-1,4-diol
1,4-bis-[p-(diethylamino-ethoxy)-phenyl]-1,4-bis-(m-fluorophenyl)-2-butyne-1,4-diol
1,4-bis-[p-(diethylamino-ethoxy)-phenyl]-1,4-bis-(p-tolyl)-2-butyne-1,4-diol
1,4-bis-[p-(di-n-propylamino-ethoxy)-phenyl]-1,4-bis-(m-chloro-phenyl)-2-butyne-1,4-diol
1,4-bis-[p-(dimethylamino-ethoxy)-phenyl]-1,4-bis-(m-chloro-phenyl)-2-butyne-1,4-diol
1,4-bis-[p-(diethylamino-propoxy)-phenyl]-1,4-bis-(m-chloro-phenyl)-2-butyne-1,4-diol
1,4-bis-[p-(diethylamino-ethoxy)-phenyl]-1,4-bis-(p-chloro-phenyl)-2-butyne-1,4-diol
1,4-bis-[p-(diethylamino-ethoxy)-phenyl]-1,4-bis-(m,p-dichloro-phenyl)-2-butyne-1,4-diol 1,4-bis-[p-(diethylamino-ethoxy)-phenyl]-1,4-bis-(p-methoxy-phenyl)-2-butyne-1,4-diol
1,4-bis-[p-(diethylamino-ethoxy)-phenyl]-1,4-bis-(p-bromo-phenyl)-2-butyne-1,4-diol
1,4-bis-[p-(diethylamino-ethoxy)-phenyl]-m-chloro-phenyl]-1,4-bis-(m-chloro-phenyl)-2-butyne-1,4-diol
1,4-bis-[p-(diethylamino-ethoxy)-o,o'-dimethyl-phenyl]-1,4-bis-(o,p-dichloro-phenyl)-2-butyne-1,4-diol
1,1;4,4-tetrakis[p-(diethyl-amino-ethoxy)-phenyl]-2-butyne-1,4-diol
1,4-bis-[p-(diethylamino-ethoxy)-phenyl]-1,4-bis-(p-nitro-phenyl)-2-butyne-1,4-diol
1,4-bis-[p-(diethylamino-ethoxy)-phenyl]-1,4-bis-(o-nitro-p-chloro-phenyl)-2-butyne-1,4-diol The end products of this invention, i.e. the compounds of Formula I, may be obtained as stereoisomers, and accordingly, this invention includes all of the possible stereoisomers of Formula I compounds, i.e. the racemates, as well as separated enantiomers and/or diastereomers. The acetylene compounds of Formula I can be prepared by several alternative processes. They can, for example, be prepared by the reaction of a benzophenone of Formula II with an acetylene di(magnesium halide). This reaction is conveniently carried out by passing acetylene in excess into an alkyl or aryl magnesium halide solution prepared from an alkyl or aryl halide and magnesium. The reaction is suitably carried out in an inert solvent such as, for example, absolute ether and the like, Preferably, there are employed at least two moles of the ketone per mole of acetylene di(magnesium halide). The reaction is conveniently carried out at a temperature between 0° and the boiling point of the solvent employed though higher or lower temperatures could also be used.

Alternatively, the acetylene compounds of Formula I can be prepared by a two-step process. An alkali metal acetylide prepared from acetylene according to a known process is first reacted with a mole of ketone to give an acetylene carbinol which is then transformed into an alkali metal acetylide which is again reacted with a mole of ketone to form the desired acetylene product.

The reaction product can be hydrolyzed without purification, for example, by pouring the reaction mixture onto a mixture of ice and dilute hydrochloric acid and thereafter making the mixture alkaline. A preferred hydrolysis procedure comprises stirring the reaction mixture into a cooled aqueous ammonium chloride solution and extracting with a suitable organic solvent which is immiscible with water, e.g., chloroform, ether, methyl chloride and the like, and thereafter washing with water. The acetylene compound is subsequently separated from the reaction mixture by known techniques. The end products, i.e. the compounds of Formula I, can be further purified by crystallization or by adsorption on aluminum oxide whereby the products are usually obtained as colorless crystals.

The invention also includes the preparation of salts of the acetylenic diols of Formula I. Acid addition salts of these compounds can be prepared by reaction with an inorganic acid such as hydrohalic acids, e.g., hydrochloric acid, hydrobromic acid and the like; sulfuric acid, phosphoric acid, etc.; or with organic acids such as oxalic acid, acetic acid, lactic acid, tartaric acid, citric acid and the like; quaternary ammonium salts such as with alkyl halides, e.g., methyl bromide, ethyl iodide, etc.; or with dialkylsulfates, e.g., dimethylsulfate, etc.; or with aralkyl halides, e.g., benzyl bromide, etc. Non-pharmaceutically acceptable acid addition salts can be converted into pharmaceutically acceptable acid addition salts by neutralization followed by reaction with a suitable pharmaceutically acceptable acid.

The novel acetylene compounds of this invention, i.e. the compounds of Formula I and the salts thereof, are, as indicated above, useful as anthelmintic agents. More particularly, they can be used for the control of worm infections in warm-blooded animals. They are especially useful against taenia and the control of *Hymenolepis nana*, the dwarf tapeworm. They are also effective against the pinworm *Syphacia obvelata*, an intestinal nematode. Thus, according to this invention, it has been found that compounds of Formula I and their pharmaceutically acceptable salts can be effectively employed for the reduction or elimination of worms in warm-blooded animals. The in vivo anthelmintic activity of compounds of Formula I has been demonstrated by biological tests in mice using standard test procedures whereby the compounds were found to be active against various species of helminths at doses of 50 mg./kg. and higher when administered orally. Thus, for example, the $CD_{50}$ value obtained for 1,4-bis-[p - (2 - diethylamino-ethoxy)-phenyl]-1,4-bis-(3-chlorophenyl) - 2 - butyne-1,4 diol, when administered orally to mice infected with *Hymenolepis fraterna* was 59 mg./kg. (calculated according to the method of Reed and Muench, Am. J. Hyg. 938, vol. 27, page 493). The same compound when administered orally to mice infected with *Syphacia obvelata* demonstrated a $CD_{50}$ of 409 mg./kg. The $LD_{50}$ for this compound is greater than 5 grams orally and the $LD_{50}$ intraperitoneally is 500 mg./kg. in mice. Since the compound is atoxic when administered orally, it can be administered in high dosage, thereby providing an extreme effective means of combatting intestinal helminthiasis by oral administration to warm-blooded animals.

The novel products of Formula I can be used as medicaments in the form of pharmaceutical preparations. The compounds of Formula I or their salts can, for example, be formulated in admixture with pharmaceutical organic or inorganic inert carrier materials which are suitable for enteral application such as, for example, water, gelatin, lactose, starch, magnesium stearate, talc, vegetable oils, gum arabic, polyalkylene glycols, Vaseline, etc., or they can be formulated in solid pharmaceutical forms with conventional excipients. For example, they can be prepared in the form of tablets, dragees, suppositories, capsules, etc., or they can be prepared in liquid form, for example, as solutions, suspensions, emulsions and the like. They can contain additives, such as preserving, stabilizing, wetting or emulsifying agents, salts for varying the osmotic pressure, buffers and the like or they can be formulated with other therapeutically useful materials.

In another of its product aspects, this invention pertains to benzophenone derivatives of Formula III which are useful as intermediates in the preparation of the novel acetylenic end products and to methods for the preparation of said benzophenone intermediates.

A particular embodiment of this product aspect of the invention comprises benzophenone derivatives of the formula

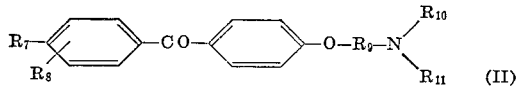

wherein $R_7$ is bromo, iodo or nitro, $R_8$ is hydrogen or halogen, each of $R_{10}$ and $R_{11}$ is independently lower alkyl or lower alkenyl and $R_9$ is lower alkylene and pharmaceutically acceptable salts thereof.

The novel compounds of Formula II in addition to being useful as intermediates have also been found to be useful as anti-tuberculosis agents. A particularly preferred group of anti-tuberculosis agents are the compounds of Formula II wherein $R_8$ is hydrogen, $R_7$ is bromo, $R_9$ is ethylene or propylene, $R_{10}$ is lower alkyl and $R_{11}$ is lower alkyl or lower alkenyl i.e. compounds of the formula

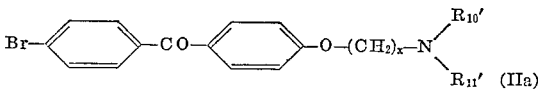

wherein X represents the integer 2 or 3, $R_{10}'$ is lower alkyl and $R_{11}'$ is lower alkyl or lower alkenyl, such that $R_{10}'$ and $R_{11}'$ together contain 3 to 6 carbon atoms and together with the $(CH_2)_x$ group contain 6 to 9 carbon atoms and pharmaceutically acceptable salts thereof.

Especially preferred are the compounds of Formula IIa wherein $x$ is 2 or 3; and particularly those in which $R_{10}$ and $R_{11}$ represent an ethyl group.

The benzophenone intermediates of Formula III which are employed as intermediates in the preparation of the novel acetylenic diols of this invention can be obtained from benzoic acid phenyl ester and the appropriately substituted benzoic acid phenyl esters via a Fries rearrangement whereby there is obtained the corresponding 4-hydroxy-benzophenone derivative which can be linked with dialkylaminoalkyl halide in the para position via the sodium salt of the 4-hydroxy-benzophenone derivative. The benzoic acid phenyl ester starting materials are known compounds or analogues of known compounds, the preparation of which is readily apparent by analogy to the known compounds.

The benzophenone intermediates are also accessible by several different alternative methods. The processes for the preparation of the benzophenone intermediates will be illustrated herein below with particular respect to the novel intermediates of Formula II.

Thus in one alternative process, the compounds of Formula II are prepared by condensing a benzophenone derivative of the formula

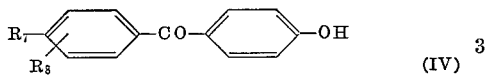

wherein $R_7$ and $R_8$ have the same meaning as above with with a tertiary amine of the formula

wherein X is a halogen atom an alkyl sulfonyloxy group or an aryl sulfonyloxy group and $R_9$, $R_{10}$ and $R_{11}$ have the same meaning as above.

A benzophenone derivative of Formula IV preferably as an alkali metal salt e.g. a sodium or potassium salt is condensed with a tertiary amine of Formula V e.g. a mesylate, tosylate, bromide or especially a chloride. The alkali metal salt can be conveniently prepared for example, by the addition of an alkali metal alcoholate such as, sodium methylate to a solution of the benzophenone derivative of Formula IV. The reaction is conveniently carried out in the presence of a suitable solvent e.g. an inert organic solvent such as the hydrocarbons or the halogenated hydrocarbons for example, chlorobenzene, toluene, xylene, ethers and the like. Alternatively, the reaction can be carried out by treating a benzophenone derivative of Formula IV with an alkali metal carbonate e.g. potassium carbonate or sodium carbonate followed by slow addition of a tertiary amine of Formula V or an acid addition salt thereof for example, a hydrohalide. The reaction in the presence of an alkali metal carbonate is suitably carried out in an inert organic solvent such as a ketone for example, acetone or methylethylketone and the like. The condensation of a benzophenone derivative of Formula IV and a tertiary amine of Formula V is suitably carried out at an elevated temperature, e.g., between about 40° C. and the boiling point of the reaction mixture, particularly between about 55° and 140° C.

In another alternative process, the compounds of Formula II are obtained by condensing a compound of the formula

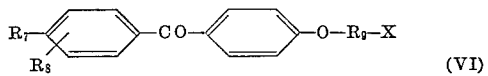

wherein $R_7$, $R_8$, $R_9$ and X all have the same meaning as above with a secondary amine of the formula

wherein $R_{10}$ and $R_{11}$ have the same meaning as above.

The compounds of Formula VI above can be prepared from the benzophenone derivatives of Formula IV by condensing with a compound of the formula $$Hal—R_9—X \qquad (IVa)$$

wherein Hal, $R_9$ and X have the same meaning as hereinabove.

The condensation with a compound of Formula IVa is suitably carried out in the presence of an alkali metal hydroxide for example, in the presence of sodium hydroxide, employing techniques per se known in the art.

The amination of a compound of Formula VI with a secondary amine of Formula VII can be carried out in the presence or absence of a solvent or if desired in the presence of an inert solvent. The amination is conveniently carried out at an elevated temperature e.g. at a temperature between about 50° C. and the boiling point of the reaction mixture.

In another alternative process, compounds of Formula II are obtained by heating an amino alcohol of the formula

wherein $R_9$, $R_{10}$ and $R_{11}$ have the same meaning as above with a benzophenone derivative of Formula IV above in the presence of a di-lower alkyl carbonate.

A suitable temperature for the reaction is between about 100° C. and 210° C., particularly a temperature between about 180° C. and 200° C. In carrying out this reaction, it is preferred to utilize the reactants in molar equivalent amounts. The di-lower alkyl carbonates suitably employed in the reaction are for example, dimethyl, diethyl, methylethyl, dibutyl-carbonate and the like. The reaction can if desired be accelerated by the use of a catalyst which is known per se for the interchange of ester radicals. For this purpose there can be named by way of example sodium and potassium metal, sodium carbonate, potassium carbonate, sodium aluminate, sodium alcoholate and titanium butylate. The reaction can be carried out in the present or absence of a solvent. The amino alcohols of Formula VIII are known compounds or readily accessible analogs of known compounds.

In another alternative process, compounds of Formula II are obtained by condensing the appropriately substituted benzene with an acid of the formula

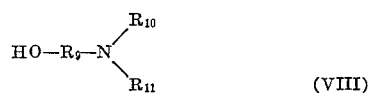

wherein $R_9$, $R_{10}$ and $R_{11}$ all have the same meaning as above or with a reactive acyl derivative of an acid of Formula IX.

Compounds of Formula IX in the form of their esters are prepared from the corresponding hydroxy benzoic acid ester by condensing with an amino derivative of Formula V by analogy to the procedure described above for the condensation of a compound of Formula V and a hydroxy compound of Formula IV. The resulting ester of a Formula IX compound can be readily transformed to the corresponding acid by known saponification techniques. The free acids of Formula IX can readily be transformed into the corresponding reactive acyl derivatives employed in the condensation, particularly an acyl halide or an anhydride, by known procedures.

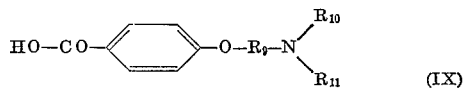

In another alternative process, compounds of Formula II are obtained by treating a compound of the formula

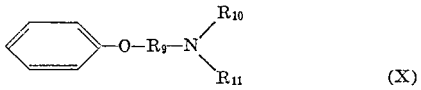 (X)

wherein $R_9$, $R_{10}$ and $R_{11}$ have the same meaning as above with a substituted benzoic acid of the formula

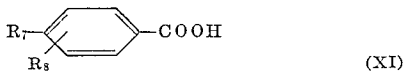 (XI)

wherein $R_7$ and $R_8$ have the same meaning as above or with a reactive acyl derivative of a compound of Formula XI.

The acylation of a substituted benzene or a compound of Formula X with an acid of Formula IX or with a substituted benzoic acid or derivatives thereof respectively is suitably accomplished by a Friedel-Craft reaction in the presence of an acid catalyst, particularly a Lewis acid such as aluminum chloride, stannous chloride, boron trifluoride, zinc chloride and the like. When a free acid is employed, hydrofluoric acid is the preferred catalyst. The acylation is conveniently carried out in the presence of a solvent such as halogenated hydrocarbon, nitrobenzene, carbon disulfide and the like. The reaction is suitably carried out at a temperature between about 0° C. and the boiling point of the reaction mixture. The starting materials of Formula X are obtained from phenol and amine derivative of Formula V by the procedure described with respect to compounds of Formula IX above. The benzoic acid derivatives are known compounds or analogs thereof which are readily obtained by methods known in the art.

In another alternative process, compounds of Formula II are obtained by oxidizing a compound of the general formula

 (XII)

wherein $R_7$, $R_8$, $R_9$, $R_{10}$ and $R_{11}$ all have the same meaning as above.

The intermediates of Formula XII are prepared from an appropriate halobenzaldehyde or an aldehyde of the formula

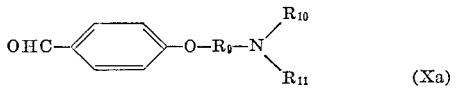 (Xa)

wherein $R_9$, $R_{10}$ and $R_{11}$ have the same meaning as above by means of a metallo organic condensation, particularly a Grignard reaction or by condensing with a lithium compound for example, the lithium derivative of a compound of the formula

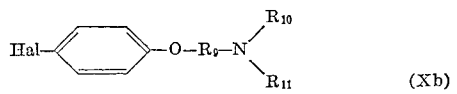 (Xb)

wherein $R_9$, $R_{10}$ and $R_{11}$ have the same meaning as above and Hal represents a halogen atom particularly bromine or chlorine.

The oxidation of a compound of Formula XII is conveniently carried out with manganese dioxide in an inert solvent such as acetone. Alternatively, the oxidation can be accomplished with chromic acid in an inert solvent such as water, ethyl acetate and the like. The oxidation can also be accomplished via the Oppenauer method by treating a compound of Formula XII with an aluminum alcoholate in the presence of a ketone for example, by treating with aluminum isopropylate or aluminum tertiary butylate in acetone. The oxidation is suitably carried out at a temperature between about 0° C. and the boiling point of the reaction mixture.

In still another alternative process, compounds of Formula II are prepared by alkylating a compound of the general formula

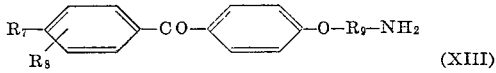 (XIII)

wherein $R_7$, $R_8$ and $R_9$ have the same meaning as above.

The alkylation or alkenylation of compounds of Formula XIII can be readily accomplished by the usual techniques for alkylation employing the usual alkylating agents or alkenylating agents such as for example, alkyl halide, particularly a chloride or a bromide; a sulfuric acid ester, e.g., an aryl or an alkyl sulfonate particularly a mesylate or tosylate. Dissimilar amino substituents are obtained by known techniques employing a nitrogen protecting group. For example, there can be employed a chloride, bromide, mesylate or tosylate of ethanol, propanol, alkyl alcohol, butanol, isopropanol, isobutanol, etc. There can also be employed dimethyl sulfate, diethyl sulfate and the like. The alkylation reaction is conveniently carried out at a temperature between about 0° C. and the boiling point of the reaction mixture and suitably in the presence of an inert solvent such as a hydrocarbon ether, a halogenated hydrocarbon and the like. Compounds of Formula XIII are prepared from compounds of Formula IV by treating the appropriate Formula IV compound with a suitable nitrile such as acrylonitrile, crotylnitrile or the like and subsequently hydrogenating the nitrile group to an aminomethylene group.

In still another alternative process, compounds of Formula II wherein $R_7$ is halo can be prepared by converting a compound of the formula

 (XIV)

wherein $R_8$, $R_9$, $R_{10}$ and $R_{11}$ all have the same meaning as above into the corresponding halo derivative by means of a Sandmeyer reaction.

The intermediates of Formula XIV are prepared from the corresponding nitro compounds by processes known per se for the reduction of the nitro group, for example, by catalytic reduction. The nitro compounds are prepared by the process described hereinabove for the preparation of the compounds of Formula II for example, by treating a 4-hydroxy-4'-nitro-benzophenone with a compound of Formula V. The amines of Formula XIV are conveniently diazotized in an aqueous acid solution and the so-obtained diazonium salt treated with a halide, e.g. bromide, particularly cuprous bromide and bromic acid. The diazotization can be carried out, for example, in sulfuric acid or in bromic acid solution. In the case where bromic acid is employed, the cuprous bromide can be prepared in situ by adding copper powder. The diazotization is suitably carried out at a reduced temperature, i.e., at a temperature between about 0° C. and about −20° C., while the transformation to the halide e.g. bromide is conveniently carried out with moderate warming.

In still another alternative process, compounds of Formula II are obtained by treating a Grignard derivative of a compound of the formula

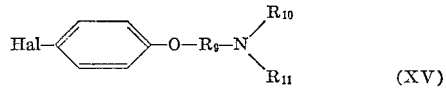 (XV)

wherein $R_9$, $R_{10}$ and $R_{11}$ have the same meaning as above and Hal represents a halogen atom with a benzonitrile of the formula

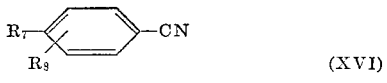 (XVI)

wherein $R_7$ and $R_8$ have the same meaning as above and hydrolyzing the resulting product.

The treatment of a benzonitrile of Formula XVI, e.g. p-bromobenzonitrile with a compound of Formula XV is carried out under the usual conditions for Grignard reactions, suitably in the presence of an inert organic solvent such as ethers, e.g., diethylether or tetrahydrofuran, at a temperature between about 0° C. and the boiling point of the reaction mixture. The reaction product is hydrolyzed in a known manner under acidic conditions.

Compounds of Formula II as noted above have been found to be active against mycobacterium, more specifically they have been found to be active against *Mycobacterium tuberculosis* commonly known as *Tubercle bacillus*, which is the etiologic agent of the infectious disease tuberculosis found in cattle and humans. In animals, compounds of Formula II have demonstrated tuberculostatic properties. Thus a comprehensive embodiment of the present invention comprises the use of a compound of Formula II in the treatment and control of tuberculosis in animals. Compounds of Formula II have also been found to be effective against strains of mycobacterium tuberculosis resistant to other anti-tubercular agents.

In another particular embodiment, the present invention comprises pharmaceutical compositions containing as an active ingredient a compound of Formula II in a form suitable for enteral or parenteral administration. In general, compounds of Formula II have been found to be active against *Mycobacterium tuberculosis* in vivo at doses of about 30 mg./kg. and higher. For example, 4-[3-(diethylamino)propoxy] - 4'-bromo-benzophenone which has an $LD_5$ of 450 mg./kg. orally in mice, is active against *Mycobacterium tuberculosis* in mice at a dose of 40 mg./kg. administered in the diet; 4-[2-(diethylamino)ethoxy]-4'-nitro benzophenone which has an $LD_{50}$ of $>900$ mg./kg., orally in mice, is active against *Mycobacterium tuberculosis* in mice at a dose of 151 mg./kg. in the diet. Tests in warm blooded animals thus demonstrate that the compounds of Formula II can be effectively employed in the therapy of tuberculosis in the same general manner as the previous known anti-tubercular agent isoniazid. This latter compound which has an $LD_{50}$ of 203 mg./kg., orally in mice, exhibits activity against *Mycobacterium tuberculosis* when tested in mice in the same general manner as the compounds of this invention at doses of about 5 mg./kg. The compounds of Formula II and pharmaceutical compositions thereof have been shown to have a pattern of activity qualitatively similar to the antitubercular agents of known clinical efficacy and are effective as anti-tubercular agents in the treatment of tuberculosis in animals.

Among the specific compounds which according to this invention have been found to be useful as anti-tuberculosis agents there can be named for example the following:

4'-bromo-4-[3-(dipropylamino)propoxy]-benzophenone
4'-bromo-4-[2-(dipropylamino)ethoxy]-benzophenone
4'-bromo-4'[2-(diethylamino)ethoxy]-benzophenone
4-[2-(diethylamino)ethoxy]-4'-nitro-benzophenone
4'-bromo-4-[3-(diethylamino)propoxy]-benzophenone.

The substituted benzophenones of Formula II which are the active ingredients of the novel compositions of this invention can be employed in the form of their free bases or as medicinally acceptable acid addition salts prepared therefrom. Acid addition salts of the compounds of Formula II can be readily prepared by known techniques with suitable inorganic acids such as for example, hydrochloric, hydrobromic, sulfuric and the like or with suitable organic acids such as benzoic, acetic, tartaric, citric, lactic, oxalic and the like.

The benzophenone derivatives employed as active ingredients in the compositions of this invention are generally white or yellow crystalline solids which have basic properties and can be conveniently prepared in the form of their acid addition salts. The bases are relatively insoluble in water though soluble in organic solvents such as alcohol and ether. The salts are characteristically crystalline solids soluble in water. Both the base and their acid addition salts are stable under ordinary conditions and suffer no breakdown when formulated into the novel compositions of the invention by the usual techniques for compounding ordinarily employed in the art.

The novel products and processes contemplated by this invention include both enteral and parenteral compositions, e.g. compositions for oral administration, compositions for injection or infusion, suppositories, etc. and methods of administration thereof to animals. The preferred compositions of this invention are the forms suitable for oral administration. Such oral forms are suitably prepared for administration in unit dosage form, such as tablets, pills, capsules, granules and the like. For preparing the solid compositions, such as tablets, the principal active ingredient is mixed with conventional tablet ingredients such as, corn starch, lactose, sucrose, sorbitol, talc, stearic acid, magnesium stearate, dicalcium phosphate and functionally similar materials employed as pharmaceutical diluents or carriers. The tablets or pills of the novel compositions can be laminated or otherwise compounded to provide a dosage form, affording the advantage of prolonged or delayed action or predetermined successive action of the enclosed medication or they can be compounded for instant release of the active ingredient for example, the tablet or pill can comprise an inner dosage and an outer dosage component, the latter being in the form of an envelope over the former. The two components can be separated by an enteric layer which serves to resist disintegration in the stomach thereby permitting the inner component to pass intact into the intestinal track or simply to be delayed in release. A variety of materials can be used for such enteric layers or coatings, such materials include for example a number of polymeric acids or mixtures of polymeric acids auch as, shellac, shellac and cetyl alcohol, cellulose acetate and the like. For oral administration, the active ingredients of Formula II are employed in daily amounts of about 10 mg. to about 250 mg. per kilogram of body weight. A preferred unit dosage form is a tablet containing 10 to 50 mg. of the active benzophenone derivative or its nontoxic salt. Tablets scored to be broken into dosage units or fractional doses, if desired, or a number of tablets to be taken at one time to constitute a dosage unit may also be employed.

A second preferred dosage unit form is a capsule containing from 10 to 50 mg. of the active benzophenone derivative of Formula II or its nontoxic salt. The capsule may be either of the hard or soft shell variety and may be made of any suitable capsule material which will disintegrate in the digestive track within 1–5 hours. Typical encapsulating materials suitable for use in the practice of this invention are for example, gelatin, methyl cellulose, etc.

The dosage forms of this invention suited to parenteral administration are the liquid forms in which the active benzophenone derivative of Formula II or a salt thereof is incorporated into an aqueous or organic solution by dissolving or suspending in an appropriate solvent which is suitable for parenteral administration. Parenteral compositions are ordinarily formulated with less than the active benzophenone derivatives than in the case of the oral forms. Suitable dosage forms for parenteral administration will ordinarily contain from about .5 to 10 mg. of the active benzophenone of Formula II dissolved or suspended in about 1 cc. of solution suitable for parenteral administration. The parenteral forms can be administered by injection intravenously, intermuscularly, or interpleureurally into fistulae or other infected areas or by infusion, e.g. intravenously into infected cavities and pleural spaces.

The suitable daily dose will be about 1 to 15 mg./kg. given in 2 or 3 divided doses. For infusion, the indicated dose is suitably obtained by preparing a solution containing .1 to 10 percent of the active benzophenone of Formula II and administering at a rate of 1 to 5 ml. per minute.

The term "dosage unit form" as employed throughout this specification refers to pharmaceutically discrete units suitable as unitary dosages for mammalian subjects each containing a predetermined quantity of active material calculated to produce the desired therapeutic affect in association with the required pharmaceutical diluent, carrier or vehicle. This invention also comprehends other forms suitable for enteral administration such as, suppositories and also aerosols for inhalation therapy. The specifications for the novel dosage unit forms of this invention are dictated by the characteristics of the active material and the particular therapeutative affect to be achieved and by the limitations inherent in the art of compounding such an active material for therapeutative use in animals.

The dosage unit forms of this invention containing a benzophenone derivative of Formula II or a pharmaceutically acceptable acid addition salt thereof, may also contain either inert or other medicinally active materials for instance, when the dosage unit form a tablet or granule there may also be present various binders, fillers or solid carrier or diluent materials. When the dosage unit form is capsule it may contain in addition to additive or diluent materials a liquid carrier such as a fatty oil. When the dosage unit form is a liquid, it can for example be in sterile aqueous solution or in physiological saline solution and the like. There may also be present regardless of the dosage unit form various flavors and other conventional excipients such as, preservatives, stabilizers, wetting or emulsifying agents, salts for varying the osmotic pressure, buffers and the like. The diluent or carrier materials employed in compounding the pharmaceutical formulations, this invention can be of the organic or inorganic variety ordinarily employed in formulating compositions suitable for enteral or parenteral administration. It will be understood of course, that any materials used in preparing dosage unit forms must be substantially non-toxic in the amounts employed for the administration of the required amount of the benzophenone derivative of Formula II which will ordinarily comprise from about 1 to 10 percent of the dosage form. The novel compositions can include or be administered in conjunction with other anti-tubercular agents to obtain advantageous combinations of their properties, e.g. they can be administered in combination with such known anti-tubercular agents as isoniazid, p-amino salicylic acid or streptomycin. When the active ingredients of this invention are administered in conjunction with known anti-tubular agents, they can be administered by the same or different routes as indicated hereinabove.

As indicated hereinabove, the effective dose of the compounds of Formula II under ordinary circumstances is between about 10 mg. and 250 mg./kg. of body weight. Effective dosages will of course depend in all instances upon the severity and individual characteristics of each case as determined by the prescribed practitioner and upon the use of nonuse of other therapy. It will be understood that dosage forms containing larger or smaller quantities of the active drug ingredient are encompassed by the scope of this invention and that such dosage forms can be administered more or less frequently than indicated heretofore. It will be understood that dosage forms containing inert ajuvants in quantities that are greater or less than those indicated above as well as in the examplars in the examples which follow are also encompassed by this invention.

The novel compositions of this invention as stated above are useful in the treatment of tuberculosis and are highly efficacious in combating tuberculosis infections when administered either orally to the infected subjected or administered directly to the locus of infection. In tests on mice, the anti-tuberculous agents of this invention were found to be efficacious when administered in the diet in amounts such that the average daily intake was about 50 mg. to about 200 mg. per kg. of body weight. The test method employed and the results obtained were as follows:

Groups of 8–10 mice are used. There are two control groups, both of which are infected. One of the control groups remains untreated while the second control group is treated with a known active anti-tubercular agent, isonicotinic acid hydrazide. The infection consists of an intravenous injection of a 1:10 dilution in saline of a week old Dubos culture of *Mycobacterium tuberculosis* H 37 RV. Treatment begins immediately after infection and continues daily for 3 weeks. On the twenty-first day, the lungs are removed from each animal and then placed in formaldehyde for 3 to 4 days to make the lesions more pronounced. The lesions are rated from 0 (none) to 4+ (widespread) and the dose necessary to cure 50 percent of the infected animals ($CD_{50}$) is calculated by the method of Reed and Muench, American Journal of Hygiene, 27:493, 1938.

| Compound: | $CD_{50}$ (mg./kg. diet) |
|---|---|
| 4-bromo - 4' - [2-(diethylamino)ethoxy]benzophenone | 78, 90, 69 |
| 4-nitro - 4' - [2-diethylamino) ethoxy]-benzophenone | 151 |
| 4-bromo - 4' - [3 - (diethylamino) propoxy]-benzophenone | 40 |
| 4-bromo - 4' - [3 - (dipropylamino) propoxy]-benzophenone | 77 |
| 4-bromo - 4' - [2 - (dipropylamino) ethoxy]-benzophenone | 420 |

The invention will be more fully understood from the examples which follow. These examples are illustrative of the invention and are not to be construed as limited thereof.

EXAMPLE 1

A solution of phenyl magnesium bromide was prepared in the usual manner from 9.6 g. of magnesium in 50 ml. of absolute ether and 70 g. of bromo-benzene in 120 ml. of absolute ether. After the addition of 25 g. of triethyl amine to the solution, acetylene di(magnesium bromide) was prepared by passing in acetylene.

After the addition of 200 ml. of methylene chloride, the acetylide was cooled in an ice-bath and treated dropwise with a solution of 61 g. of 4-β-diethylamino-ethoxy-4'-methyl-benzophenone in 200 ml. of methylene chloride. The reaction mixture was subsequently heated to boiling under reflux conditions for 2 hours, thereafter cooled, poured into an ice-cold saturated amomnium chloride solution and extracted with methylene chloride. The extract was washed several times with water, then dried over sodium sulfate, filtered and evaporated under reduced pressure. The crude product which remained behind was recrystallized from acetic acid ethyl ester/petroleum ether (boiling range 40–45° C.) to give 1,4-bis-[p-(diethylamino-ethoxy)-phenyl]-1,4-bis - (p-tolyl)-2-butyne-1,4-diol in the form of colorless crystals melting at 104–106° C.

The 4-β-diethylamino-ethoxy-4'-methyl-benzophenone employed as starting material was prepared as follows:

255 g. of 4-toluic acid phenyl ester was dissolved in 680 ml. of nitro-benzene and, after the addition of 204 g. of powdered aluminum chloride was heated at 60° for 24 hrs. The solution was allowed to cool and then poured on ice-cold 3-N hydrochloric acid and extracted with ether. The ether extract was further washed twice with 2-N hydrochloric acid and thereupon extracted with 7.5 percent caustic soda until the alkaline aqueous solution was no longer colored. The alkaline aqueous extract was acidified with concentrated hydrochloric acid, extracted with ether and the ether phase washed four times with water, dried over sodium sulfate, filtered and evaporated in vacuo. There was thus obtained 4-hydroxy-4'- methyl-benzophenone which melted at 164–165° C. after recrystallization from an acetone/benzene mixture.

142.4 g. of 4-hydroxy-4'-methyl-benzophenone was dissolved by warming in a mixture of 2.8 liters of chlorobenzene and 150 ml. of ethanol. After the addition of 37 g. of sodium methylate, about ⅓ of the solvent mixture was distilled off at normal pressure (until the boiling temperature of the chloro-benzene had been reached) and the reaction mixture was allowed to cool. 110 g. of N-diethylamino-ethyl chloride were then added dropwise and, after complete addition, the mixture was heated to boiling for 20 hours. The suspension obtained was allowed to cool, extracted with methylene chloride and the methylene chloride extract was consecutively washed with 2 percent caustic soda and four times with water.

After drying over sodium sulfate, the filtered methylene chloride extract was evaporated in vacuo. The 4-β-diethylamino-ethoxy-4'-methyl-benzophenone obtained was purified by distillation in high vacuum boiling at 108°/0.02 mm.

EXAMPLE 2

Employing 62 g. of 4-β-diethylamino-ethoxy-3'-fluoro-benzophenone there was obtained according to the working conditions set out in Example 1, 1,4-bis-[p-(diethylamino-ethoxy)-phenyl]-1,4 - bis - (m-fluorophenyl)-2-butyne-1,4-diol. After recrystallization from acetic acid ethyl ester/petroleum ether (boiling range 40–45° C.), the product was obtained in the form of colorless crystals melting at 129–131° C.

The 4-β-diethylamino-ethoxy-3'-fluoro - benzophenone (B.P. 155–158° C./0.01 mm. Hg; $n_D^{25}=1.5632$) employed as starting material was prepared according to the working instructions set out in Example 1 starting from 3-fluoro-benzoic acid ethyl ester via 3-fluoro-4'-hydroxy-benzophenone (M.P. 132–134° C.).

EXAMPLE 3

A solution of ethyl magnesium bromide was prepared in the usual manner from 9.6 g. of magnesium in 50 ml. of absolute ether and 45 g. of ethyl bromide in 200 ml. of absolute ether. From this solution there was prepared acetylene di(magnesium bromide) by passing in acetylene.

After the addition of 200 ml. of methylene chloride, the acetylide was cooled in an ice-bath and treated dropwise with a solution of 80 g. of 4-β-diethylamino-ethoxy-3'-chloro-benzophenone and worked up according to the working conditions set out in Example 1. The crude 1,4-bis-[p-(diethylamino-ethoxy)-phenyl] - 1,4-bis(m-chloro-phenyl)-2-butyne-1,4-diol obtained was recrystallized from acetic acid ethyl ester/petroleum ether (boiling range 60–90° C.) or from ethyl alcohol to give colorless crystals melting at 138–140° C.

The 4-β-diethylamino-ethoxy-3'-chloro - benzophenone (B.P. 128–132° C.; $n_D^{25}=1.5800$) employed as starting material was prepared according to the working instructions given in Example 1 starting from 3-chloro-benzoic acid phenyl ester via 3-chloro-4'-hydroxy-benzophenone (M.P. 168–169° C.).

EXAMPLE 4

Employing 72 g. of 4-β-di-n-propylamino-ethoxy-3'-chloro-benzophenone, there was obtained according to the working conditions set out in Example 1 1,4-bis-[p-(di-n-propylamino-ethoxy)-phenyl]-1,4 - bis - (m-chloro-phenyl)-2-butyne-1,4-diol. After recrystallization from ethyl alcohol the product was obtained in the form of colorless crystals melting at 113–117° C.

The 4-β-di-n-propylamino-ethoxy-3'-chloro - benzophenone (B.P. 193–198° C./0.015 mm. Hg; $n_D^{25}=1.5670$) employed as starting material was prepared according to the working instructions given in Example 1 starting from 3-chloro-benzoic acid phenyl ester via 3-chloro-4'-hydroxy-benzophenone (M.P. 168–169° C.).

EXAMPLE 5

Employing 69 g. of 4-β-diethylamino-ethoxy-3-methyl-3'-chloro-benzophenone there was obtained according to the working conditions set out in Example 1, 1,4-bis-[p-diethylamino-ethoxy)-m - tolyl] - 1,4-bis - (m - chloro-phenyl)-2-butyne-1,4-diol. After recrystallization from ethyl alcohol, the product was obtained in the form of colorless crystals melting at 133–137° C.

The 4-β-diethylamino-ethoxy-3-methyl-3'-chloro-benzophenone (B.P. 180–184° C./0.02 mm. Hg; $n_D^{23}=1.5780$) employed as starting material was prepared according to the working instructions given in Example 1 starting from 3-chloro-benzoic acid 2-tolyl ester via 3-chloro-3'-methyl-4'-hydroxy-benzophenone ($n_D^{24}=1.5672$).

EXAMPLE 6

Employing 90 g. of 4-β-diethylamino-ethoxy-4'-bromo-benzophenone there was obtained according to the working conditions set out in Example 3 1,4-bis[p-diethylamino-ethoxy)-phenyl] - 1,4-bis - (p-bromo-phenyl) - 2-butyne-1,4-diol. After recrystallization from acetic acid ethyl ester/petroleum ether (boiling range 40–45° C.), the product was obtained as colorless crystals melting at 138–140° C.

The 4-β-diethylamino-ethoxy-4'-bromo - benzophenone (M.P. 75–76° C.) employed as starting material was prepared according to the working instructions given in Example 1 starting from 4-bromo-benzoic acid phenyl ester via 4-bromo-4'-hydroxybenzophenone.

EXAMPLE 7

Employing 88 g. of 4-β-diethylamino-ethoxy-3-chloro-3'-chloro-benzophenone there was obtained according to the working conditions set out in Example 3 1,4-bis-[p-diethylamino-ethoxy) - m - chloro - phenyl]-1,4 - bis-(m-chloro-phenyl)-2-butyne-1,4-diol. After recrystallization from benzene, the product was obtained as colorless crystals melting at 163–164° C.

The 4-β-diethylamino-ethoxy-3-chloro-3'-chloro-benzophenone ($n_D^{27}=1.5773$) employed as starting material was prepared according to the working instructions given in Example 1 starting from 3-chloro-benzoic acid 2-chloro-phenyl ester via 3-chloro-3'-chloro-4'-hydroxy-benzophenone (M.P. 134–135° C.).

EXAMPLE 8

Employing 94 g. of 4-β-diethylamino-ethoxy-2,6-dimethyl-2',4'-dichloro-benzophenone there was obtained according to the working conditions set out in Example 3 1,4-bis[p-(diethylamino-ethoxy)-o,o'-dimethyl - phenyl]-1,4-bis-(o,p-dichloro-phenyl)-2-butyne-1,4-diol. After recrystallization from acetic acid ethyl ester/petroleum ether (boiling range 40–45° C.), the product was obtained as colorless crystals melting at 200–201° C.

The 4-β-diethylamino-ethoxy-2,6 - dimethyl - 2',4'-dichloro-benzophenone ($n_D^{22}=1.5801$) employed as starting material was prepared according to the working instructions given in Example 1 starting from 2,4-dichloro-benzoic acid-3,5-dimethyl-phenyl ester via 2,4-dichloro-2',6'-dimethyl-4' - hydroxy-benzophenone (M.P. 184–185° C.).

EXAMPLE 9

Employing 82 g. of 4,4'-bis-(4-β-diethylamino-ethoxy)-benzophenone there was obtained according to the working conditions set out in Example 3 1,1;4,4-tetrakis-[p-(diethylamino-ethoxy)-phenyl]-2-butyne-1,4-diol, a viscous, light brown oil which was purified by adsorption on aluminum oxide (activity grade III).

The 4,4'-bis(4-β-diethylamino-ethoxy) - benzophenone ($n_D^{25}=1.5488$) employed as starting material was prepared according to the working instructions given in Example 1 starting from 4-hydroxy-benzoic acid phenyl ester via 4,4'-dihydroxy-benzophenone (M.P. 206° C.).

EXAMPLE 10

Employing 80 g. of 4-β-diethylamino-ethoxy-4'-nitro-benzophenone there was obtained according to the working conditions set out in Example 3, 1,4-bis-[p-(diethylamino-ethoxy)-phenyl]-1,4 - bis(p - nitro - phenyl)-2-butyne-1,4-diol in the form of slightly yellow-colored crystals which melted at 94–98° C. after recrystallization from acetic acid ethyl ester.

The 4-β-diethylamino-ethoxy-4' - nitro - benzophenone (M.P. 89–90° C.) employed as starting material was prepared according to the working instructions given in Example 1 starting from 4-nitro-benzoic acid phenyl ester via 4-nitro-4'-hydroxy-benzophenone (M.P. 191–193° C.).

EXAMPLE 11

Employing 30 g. of 4-β-diethylamino-ethoxy-2'-nitro-4'-chloro-benzophenone there was obtained according to the working conditions set out in Example 3, 1,4-bis-[p-(diethylamino-ethoxy)-phenyl]-1,4-bis - (o-nitro - p-chlorophenyl)-2-butyne-1,4-diol in the form of slightly yellow-colored crystals which, after recrystallization from acetic ethyl ester/petroleum ether (boiling range 40–45° C.), melted at 121–123° C.

The 4-β-diethylamino-ethoxy-2'-nitro - 4'-chloro-benzophenone ($n_D^{22}=1.5948$) employed as starting material was prepared according ot the working directions given in Example 1 starting from 2-nitro-4-chloro-benzoic acid phenyl ester via 2-nitro-4-chloro-4'-hydroxy-benzophenone (M.P. 190–192° C.).

EXAMPLE 12

85.0 g. of 4-hydroxy-4'-bromo-benzophenone were dissolved by warming in a mixture of 1 liter of chloro-benzene and 70 ml. of ethanol. After the addition of 20 g. of sodium methylate, about ⅓ of the solvent mixture was distilled off at normal pressure (until the boiling temperature of the chloro-benzene had been reached) and the reaction mixture was allowed to cool. 61 g. of N-diethylaminopropyl chloride were then added dropwise and, after complete addition, the mixture was heated to boiling for 5 hours. The suspension obtained was allowed to cool, extracted with ether and the ether extract was consecutively washed with 2% caustic soda and four times with water.

After drying over sodium sulfate, the filtered ether extract was evaporated in vacuo. The 4-β-diethylaminopropoxy-4'-bromo-benzophenone obtained was purified by crystallization in petroleum ether (boiling range 60–90°); M.P. 62–63°.

EXAMPLE 13

85.0 g. of 4-hydroxy-4'-benzophenone was dissolved in a mixture of 1 l. of chlorobenzene and 70 ml. ethanol with warming. After the addition of 20 g. of sodium ethylate, about one-third of the solvent mixture was distilled off at normal pressure (until the temperature reached the boiling point of the chlorobenzene) and the reaction mixture was allowed to cool. 61 g. of N-diethylaminopropylchloride was added dropwise and after the addition was completed the mixture was refluxed for 5 hours. After cooling, the suspension was extracted with ether and the ether fraction was washed once with a 2 percent sodium carbonate solution and four times with water.

After drying of sodium sulfate, the filter ether extract was concentrated in vacuo. The so-obtained 4-γ-diethylaminopropoxy-4'-benzophenone after being purified by crystallizing from petroleum ether (boiling point 60°–90°) melted at 62°–63°.

The 4-hydroxy-4'-benzophenone employed as starting material was prepared as follows:

126 g. of 4-bromobenzoic acid phenyl ester was dissolved in 400 ml. of nitro-benzene and after the addition of 90 g. of powdered aluminum chloride, the temperature was maintained at 60° for forty hours. The cooled solution was then poured onto ice cold 3 N hydrochloric acid and extracted with ether. The ether extract was washed twice with 2 N hydrochloric acid and extracted with 7.5 percent sodium carbonate solution until the alkali wash solution was no longer colored. The alkali wash extract was acidified with concentrated hydrochloric acid, extracted with ether and the ether phase washed four times with water, dried over sodium sulfate, filtered and concentrated in vacuo. There was thus obtained 4-hydroxy-4'-benzophenone which after recrystallizing from an acetone-benzene mixture (1:10 ratio) melted at 192°–193° C.

EXAMPLE 14

By analogy to Example 13 starting from 4-hydroxy-4'-bromobenzophenone and N - dipropylaminoethylchloride there was obtained 4 - β - dipropylaminoethoxy-4'-bromo-benzophenone having a melting point of 78–79° bromo-benzophenone having a melting point of 78–79° C.

EXAMPLE 15

10 g. of 4-bromo-4'-hydroxy-benzophenone was dissolved in 150 ml. of ethylmethyl ketone treated with 15 g. of calcium carbonate and heated to reflux. The solution was refluxed in a Soxhlet condenser containing 8 g. of diethylaminopropylchloride in the thimble. Refluxing was continued until all of the hydrochloride was dissolved from the thimble. The solution was then filtered from the salt and the solvent was distilled off. The residue was taken up with ether and washed with five percent sodium carbonate solution and water. The dried ether solution was evaporated and the remaining residue crystallized from petroleum ether (boiling point 60– 90°). There was thus obtained 4-γ-diethylaminopropoxy-4'-bromo-benzophenone as crystals having a melting point of 62–63°.

EXAMPLE 16

By analogy to Example 15 starting with 4-bromo-4'-benzophenone and ethyl - n - butylaminoethyl - chloride-hydrochloride, there was obtained 4-β-ethyl-n-butylamino-ethoxy-4'-bromo-benzophenone having a melting point of 57–58°.

EXAMPLE 17

20 g. of 4-γ-bromopropoxy-4'-bromo-benzophenone was dissolved in 30 ml. of ethyl-allylamine and heated on a vapor bath for four hours. The reaction mixture was concentrated by evaporation. The residue was treated with 3 N sodium carbonate solution and ether. The ether layer was separated, washed with sodium carbonate solution and water, dried over sodium sulfate and evaporated to dryness. The residue was recrystallized from petroleum ether (boiling range 60–90° C.). There was thus obtained 4-γ-ethyl-allylamino-propoxy-4'-bromo-benzophenone having melting point of 58–59° C.

The 3-γ-bromopropoxy-4'-bromo-benzophenone employed as a starting material can be prepared as follows:

20 g. of 4-hydroxy-4'-bromo-benzophenone, 100 ml. of dioxane and 18 g. of 1,3-dibromopropane were combined and 75 ml. of 1 N sodium carbonate solution was added dropwise over the course of ten minutes. The mixture was then heated to 90° C. for two hours under stirring. The cooled reaction mixture was taken up in ether. The ether extract was washed with 1 N sodium carbonate solution and water, dried over sodium sulfate and evaporated to dryness. The residue was crystallized from petroleum ether (melting range 60–90° C.). There was thus obtained 3-γ-bromopropoxy-4'-bromo-benzophenone having a melting point of 100–101° C.

EXAMPLE 18

By analogy to Example 17 starting with 3-γ-bromopropoxy - 4' - bromo - benzophenone and dipropylamine there was obtained 4-γ-dipropylaminopropoxy-4'-bromo-benzophenone having a melting point of 63–64°.

EXAMPLE 19

13.8 g. of 4-hydroxy-4'-bromo-benzophenone, 7 g. of diethylcarbonate, 7 g. of γ-diethylaminopropanol and 0.1 g. of calcium carbonate were combined in a flask fitted with a stirrer and 20 ml. Vigreux column and descending condenser. The reaction mixture was slowly heated under stirring until the temperature in the flask reached 180° C. The temperature was maintained at about 180° C. for two hours with stirring so that the temperature at the head of the column never went above 90° C. The cooled mixture was taken up in ether. The ether extract was washed with 1 N sodium carbonate solution and water, dried over sodium sulfate and evaporated to dryness. The residue was crystallized from petroleum ether (melting range 60 to 90° C.). There was thus obtained 4-γ-diethylaminopropoxy-4'-bromo-benzophenone having a melting point of 66–67°.

EXAMPLE 20

By analogy to Example 19 starting with 4-hydroxy-4'-bromobenzophenone and γ-methyl-propylaminopropanol there is obtained 4 - γ - methyl - propylaminopropoxy-4'-bromo-benzophenone having a melting point of 83–84°.

EXAMPLE 21

By analogy to Example 19 starting with 4-hydroxy-4'-bromo-benzophenone and β-ethyl-propylamino there is obtained 4 - β - ethyl-propylaminoethoxy-4'-bromo-benzophenone having a melting point of 73°.

EXAMPLE 22

By analogy to Example 19 starting with 4-hydroxy-4'-bromo-benzophenone and γ-ethyl-propylaminopropanol there is obtained 4-γ-ethyl-propylaminopropoxy-4'-bromo-benzophenone having a melting point of 68–69°.

EXAMPLE 23

By analogy to Example 19 starting with 4-hydroxy-4'-bromobenzophenone and ethyl-allylaminoethanol there is obtained 4 - β-ethyl-allylaminoethoxy-4'-bromo-benzophenone having a melting point of 65–66°.

EXAMPLE 24

By analogy to Example 19 starting with 4-hydroxy-4'-bromo-benzophenone and ethyl-crotylaminoethanol there is obtained 4-β-ethyl-crotylaminoethoxy-4'-bromo-benzophenone having a melting point of 72–73°.

EXAMPLE 25

By analogy to Example 19 starting with 4-hydroxy-4'-bromo-benzophenone and diisopropylaminoethanol there is obtained 4-β-diisopropylaminoethoxy-4'-bromo-benzophenone having a melting point of 104–105°.

EXAMPLE 26

40 g. of bromobenzene, 34 g. 4-[3-(diethylamino)-propoxy]-benzoylchloride - hydrochloride and 150 ml. of carbon disulfide were mixed in an ice bath and 30 g. of aluminum chloride was added over the course of thirty minutes at a temperature of 0–5°. The mixture was stirred at 20–25° for four hours and combined with ice and hydrochloric acid. The reaction mixture was filtered and the solid substance obtained was digested in ether and agitated with 3 N sodium carbonate solution for one hour. The ether solution was washed neutral, dried and evaporated to dryness whereby there was obtained as residue 4-γ-diethylamino-propoxy-4'-bromo-benzophenone which by thin layer chromatogram was identical to the product obtained according to Example 13.

The 4-[3-(diethylamino)-propoxy]-benzoylchloride employed as a starting material was prepared as follows:

83 g. of p-hydroxybenzoic acid ethyl ester, 500 ml. of acetone and 100 g. of calcium carbonate were heated to the boiling point with stirring and 85 g. of 3-diethylaminopropylchloride was added dropwise in the course of one hour. The mixture was refluxed for ten hours, cooled and filtered. The acetone solution was vaporated to dryness and the residue was saponified by heating with an excess of 1 N alcoholate sodium solution for one hour. The solution was acidified with hydrochloric acid, dried in vacuo and the residue extracted with alcohol. The alcohol extract was dried and the residue recrystallized from methanol-ether. There was thus obtained 4-[3-(diethylamino)-propoxy]-benzoic acid-hydrochloride having a melting point of 187–188°. Chlorination was accomplished by treating the acid with an excess of thionylchloride with reflux for three hours and evaporating to dryness, whereby there was obtained 4-[3-(diethylamino)-propoxy]-benzoylchloride-hydrochloride having a melting point of 162–163°.

EXAMPLE 27

20 g. of 3-diethylaminopropoxybenzene was dissolved in 150 ml. carbon disulfide. Hydrogen chloride gas was conducted into the mixture to prepare the hydrochloride and 22 g. of p-bromobenzoyl-chloride was added. The mixture was cooled with ice and stirred for thirty minutes while 20 g. of powdered aluminum chloride was added at 0–5°. The cooling was discontinued and the reaction mixture was stirred for three hours at 20° C. The reaction product was worked up by pouring the mixture onto ice and hydrochloric acid, filtering the hydrochloride through a suction filter, washing with water, digesting the solid with hydrogen chloride in 200 ml. of ether and agitating with 50 ml. of 3 N sodium carbonate solution for one hour in order to prepare the free amine. The ether solution was washed neutral with water, dried and concentrated. The remaining solid residue was crystallized from hexane to give 4-γ-diethylamino-propoxy-4'-bromo-benzophenone having a melting point of 65–66°.

EXAMPLE 28

1 g. of 4-bromophenyl-4'-(γ-diethylaminopropoxyphenyl)-carbinol was combined with 50 ml. of acetone and 5 g. of manganese dioxide and refluxed for ten hours. After cooling the mixture was filtered, evaporated and the residue crystallized from hexane. There was obtained 4-γ-diethylaminopropoxy-4'-bromo-benzophenone having a melting point of 65–66°. The carbinol starting material can be obtained for example, by the reaction of p-bromobenzaldehyde with p-bromodiethylaminopropoxy-benzene. The 4 - bromophenyl-4'-(γ-diethylaminopropoxyphenyl) carbinol thus obtained melted at 64–65°.

EXAMPLE 29

0.5 g. of the hydrochloride of 4-γ-aminopropoxy-4'-bromo-benzophenone, 50 ml. of acetone, 5 g. of calcium carbonate and 0.5 g. of ethyl-iodide were heated to reflux for five hours. The resulting mixture was filtered and the filtrate evaporated. The residue was identical with 4-γ-diethylaminopropoxy-4'-bromo-benzophenone on a thin layer chromatogram.

The hydrochloride starting material was obtained as follows:

4.6 g. N of sodium were dissolved in 350 ml. of ethanol. After the addition of 55.4 g. of 4-hydroxy-4'-bromo-benzophenone the entire mixture was heated to reflux temperature and 60 g. of 1,3-dibromopropane was added. The resulting mixture was heated for six hours and cooled and the solvent distilled off. After treating with an excess of 3 N sodium carbonate solution, the mixture was extracted twice with 500 ml. of ether. The ether solution was washed neutral, dried over sodium sulfate and the solvent distilled off. The crystalline residue was dissolved in isopropyl ether. Upon crystallization 4-bromo-4'-(γ-bromopropoxy)-benzophenone was obtained as white crystals melting at 99–101°.

A mixture of 34 g. of 4-bromo-4'-(γ-bromopropoxy)-benzophenone and 24 g. of hexamethylenetetramine were dissolved in 500 ml. of acetonitrile and held at the reflux temperature under stirring for one hour. The resulting mixture was cooled and the crystalline precipitate filtered off by suction. The latter was dissolved in 1 l. of methanol and treated with an excess of methanolic hydrogen chloride. After standing for an hour the solvent was distilled off. The residue was treated with 200 ml. of 3 N hydrochloric acid and the crystalline precipitate filtered off by suction, washed with alcohol and ether and recrystallized from 200 ml. of dimethylformamide. There was thus obtained 4-(γ-aminopropoxy)-4'-bromo-benzophenone hydrochloride having a melting point of 275–276° (dec.). The base melted at 116–118° (from toluene petroleum ether).

EXAMPLE 30

2.1 g. of cuprous sulfate, 0.66 g. of copper powder, 4 g. of sodium bromide, 1 g. of concentrated sulfuric acid and 35 ml. of water were heated at reflux for twelve hours.

10.7 g. of 4-γ-diethylaminopropoxy-4'-amino-benzophenone, 100 ml. of water and 10 g. of concentrated sodium acid were stirred at 15° and during 15 minutes a solution of 2.4 g. of sodium nitrile and 10 ml. of water and added dropwise at 15–20°.

The solution obtained according to paragraph one was heated to the boiling point and the solution obtained according to paragraph two was added dropwise over a period of 30 minutes. After heating for an additional thirty minutes at reflux, the mixture was cooled, made alkaline with sodium carbonate and taken up in either. After washing with water, the ether solution was dried, evaporated and the residue chromatographed on aluminum oxide (activity II), eluted with benzene and 10 percent ether, evaporated and the residue crystallized from hexane. There was thus obtained 4-γ-diethylaminopropoxy-4'-bromo-benzophenone having a melting point of 65–66°.

The 4-γ-diethylaminopropoxy-4'-amino-benzophenone employed as a starting material was obtained as follows:

By analogy to Example 13 using 4-hydroxy-4'-nitro-benzophenone and N-diethylaminopropylchloride there was obtained 4-γ-diethylaminopropoxy-4'-nitro-benzophenone having a melting point of 65–66°. This compound was hydrogenated with Raney nickel to give 4-γ-diethylaminopropoxy-4'-amino-benzophenone having a melting point of 91–92°.

EXAMPLE 31

29 g. of p-bromo-diethylaminopropoxybenzene in 100 ml. of absolute tetrahydrofuran was stirred with 2.4 g. of magnesium until the magnesium dissolved. 18.2 g. of p-bromo-benzonitrile in 50 ml. of tetrahydrofuran was added dropwise to the mixture at 0°.

The resulting mixture was added to reflux for 12 hours and then poured into water, made acid with dilute hydrochloric acid and agitated for two hours at 20°. The resulting solution was extracted with ether, dried over sodium sulfate and evaporated, whereby 4-γ-diethylaminopropoxy-4'-bromo-benzophenone was obtained as residue which upon crystallizing from petroleum ether, melted at 65–66°.

The necessary p-bromo-diethylaminopropoxybenzene starting material was obtained as follows:

34.6 g. of p-bromophenol, 25 g. of diethylcarbonate, 26.2 g. diethylaminopropanol and 0.2 g. of diethyl calcium carbonate were heated with stirring and the ethanol distilled off until the temperature of the reaction mixture rached 190°. The reaction mixture was heated for an additional two hours at 190°, then cooled, mixed with water, extracted with ether, dried over sodium sulfate and evaporated. There was thus obtained as residue p-bromo-diethylaminopropoxybenzene which distilled at 91–95°/0.03 mm.

EXAMPLE 32

The following compositions exemplify pharmaceutical formulations incorporating the novel anthelmintic end products of this invention.

200 g. of 1,4-bis-[p-(diethylamino-ethoxy)-phenyl]-1,4-bis-(o-nitro-p-chloro-phenyl)-2-butyne-1,4-diol and 125 g. of potato starch were intimately mixed and moistened with 80 g. of an aqueous 4 percent gelatin solution w.s. The mass obtained was granulated, dried at room temperature, mixed with 1.5 g. of magnesium stearate and 23.5 g. of talc and pressed into kernels having a diameter of 10 mm. The kernels were coated in the usual manner. Each degree weighed about 350 mg. and contained 200 mg. of active material.

100 g. of 1,4-bis-[p-(diethylamino-ethoxy)-phenyl]-1,4-bis-(m-chloro-phenyl)-2-butyne-1,4-diol were well mixed with 60 g. of lactose and 90 g. of maize starch and moistened with 60 g. of an aqueous 4 percent gelatin solution q.s. The mass obtained was passed through a coarse sieve (mesh with ca 4 mm.) and dried at about 45° C. The dry granulate was subsequently brought to a kernel size of 1.2 to 1.5 mm., mixed with 4 g. of talcum and 10 g. of calcium stearate and pressed into tablets. Each tablet weighed about 250 mg. and contained 100 mg. of active material.

75 g. of 1,4-bis-[p-(diethylamino-ethoxy)-phenyl]-1,4-bis-(m-fluoro-phenyl)-2-butyne-1,4-diol, 100 g. of lactose, 20 g. of maize starch and 5 g. of talcum were well mixed, passed through a sieve having a mesh width of 0.5 mm. and filled into gelatin capsules size No. 4. Each capsule weighed ca 200 mg. and contained 75 mg. of active material.

EXAMPLE 33

The following compositions exemplify pharmaceutical formulations incorporating the novel benzophenone intermediates of this invention for use as anti-tubercular agents.

| Parenteral formulation: | | Per cc. |
|---|---|---|
| 4-bromo-4'-[2-(diethylamino)ethoxy]benzophenone | mg | 1.0 |
| Propylene glycol | cc | 0.4 |
| Benzyl alcohol (benzaldehyde free) | cc | 0.015 |
| Ethanol U.S.P. | cc | 0.10 |
| Sodium benzoate | mg | 48.8 |
| Benzoic acid | mg | 1.2 |
| Water for injection q.s. to 1 ml. | | |

Procedure (for 10,000 cc.):

(1) The 10 gm. of 4-bromo-4'-[2-(diethylamino)ethoxy]benzophenone were dissolved in 150 cc. of benzyl alcohol; 4,000 cc. of propylene glycol and 1,000 cc. of ethanol were added.

(2) The 12 gm. of benzoic acid were dissolved in the above. The 488 gm. of sodium benzoate dissolved in 3,000 cc. of water for injection were added. The solution was brought up to final volume of 10,000 cc. with water for injection.

(3) The solution was filtered through an 02 Selas candle, filled into suitable size ampuls, gassed with $N_2$ and sealed. It was then autoclaved at 10 p.s.i. for 30 minutes.

| Suppository formulation: | Per 1.3 gm. suppository, gm. |
|---|---|
| 4-bromo-4'-[2-(diethylamino)ethoxy]benzophenone | 0.025 |
| Wecobee M | 1.230 |
| Carnauba wax | 0.045 |

Procedure:

(1) The Wecobee M and carnauba wax were melted in a suitable size glass lined container (stainless steel may also be used), mixed well and cooled to 45° C.

(2) 4-bromo-4'-[2-(diethylamino)ethoxy]benzophenone, which had been reduced to a fine powder with no lumps, was added and stirred until completely and uniformly dispersed.

(3) The mixture was poured into suppository molds to yield suppositories having an individual weight of 1.3 gms.

(4) They were cooled and removed from molds. The suppositories were individually wrapped in wax paper for packaging (foil may also be used).

Capsule formulation:                                  Per capsule, mg.
    4-bromo - 4' - [2-(diethylamino)ethoxy]benzo-
        phenone _____   10
    Lactose _____  173
    Corn starch _____   37
    Talc _____    5
                                                  ———
        Total weight _____  225

Procedure:

(1) 4-bromo - 4' - [2-(diethylamino)ethoxy]benzophenone was mixed with the lactose and corn starch in a suitable mixer.

(2) The mixture was further blended by passing through a Fitzpatrick Comminuting Machine with a No. 1A screen with knives forward.

(3) The blended powder was returned to the mixer, the talc added and blended thoroughly. It was then filled into No. 4 hard shell gelatin capsule on a Parke David capsulating machine (any similar type machine will do).

Tablet formation:                                     Per tablet, mg.
    4-bromo - 4' - [2-(diethylamino)ethoxy]benzo-
        phenone _____   25.0
    Lactose, spray dried _____   72.0
    Corn starch, U.S.P. _____    2.0
    Calcium stearate _____    1.0
                                                  ———
        Total weight _____  100.0

Procedure:

(1) 4 - bromo-4'-[2-(diethylamino)ethoxy]benzophenone, lactose, corn starch and calcium stearate were blended in a suitable mixer.

(2) The powder was compressed on a heavy duty tablet compressing machine and yielded tablet slugs of about 1" diameter and ¼" thickness.

(3) The tablet slugs were passed through a suitable comminuting machine and yielded granules of approximately 16 mesh with a minimum of fines.

(4) The granulation was recompressed on a tablet compressing machine using a ¼" standard concave punch to an average tablet weight of 100 mg.

EXAMPLE 34

85.0 g. of 4-hydroxy-4'-bromo-benzophenone was dissolved in a mixture of 1 liter of chlorobenzene and 70 ml. of ethanol with warming. After the addition of 20 g. of sodium methylate, about ⅓ of the solvent mixture was distilled off at normal pressure (until the boiling temperature of chlorobenzene is reached) and the reaction mixture allowed to cool. 61 g. of N-diethylamino-propyl chloride were then added dropwise and after complete addition, the mixture was heated to boiling for 5 hours. The suspension obtained was allowed to cool, extracted with ether and the ether thus obtained was successively washed with 2 percent caustic soda and four times with water.

After drying over sodium sulfate, the filtered ether extract was evaporated in vacuum. The 4-[2-(diethylamino)propoxy]-4'-bromo-benzophenone obtained was purified by crystallization from petroleum ether (boiling range 60–90°); melting point 62–63° C.

EXAMPLE 35

In an analogous manner to Example 34, starting from 4-hydroxy-4'-bromobenzophenone and N-dipropylaminoethyl chloride there was obtained 4-[2-(dipropylamino)ethoxy]-4'-bromobenzophenone of melting point 78–79°.

EXAMPLE 36

In an analogous manner to Example 34, starting from 4 - hydroxy - 4' - bromobenzophenone and N-di-n-butylaminopropyl chloride there was obtained 4-[3-(di-n-butylamino)propoxy] - 4'-bromobenzophenone of melting point 67–68°.

EXAMPLE 37

In an analogous manner to Example 34, starting from 4 - hydroxy - 4' - nitrobenzophenone and N-diethlaminopropyl chloride there was obtained 4-[3-diethylamino)propoxy] - 4' - nitrobenzophenone of melting point 65–66°.

EXAMPLE 38

In an analogous manner to Example 34, starting from 4 - hydroxy - 4' - bromobenzophenone and N - diallylaminoethyl chloride there was obtained 4-[2-diallylamino)ethoxy] - 4' - bromobenzophenone of melting point 73–74°.

EXAMPLE 39

50 g. of diallylaminoethyl alcohol was dissolved in 250 ml. of benzene and treated with 50 ml. of thionyl chloride at 10–50°. The mixture was stirred at 20–25° for 2 hours, then the excess thionyl chloride and the benzene were distilled off and the solid residue was dried in vacuum. Diallylaminoethyl chloride hydrochloride was obtained as a light grey hygroscopic powder. 10 g. of 4-bromo-4'-hydroxy-benzophenone was dissolved in 150 ml. of ethyl methyl ketone, treated with 15 g. of potassium carbonate and boiled at reflux in such a way that the return stream passed an extraction thimble in which there was placed 8 g. of diallylaminoethyl chloride hydrochloride. The mixture was boiled until the hydrochloride in the thimble was dissolved away. The solution was then filtered from the salt, the solvent distilled off, the residue taken up in ether and washed with 5 percent caustic soda and water. The dried ether solution was evaporated and the solid residue crystallized from petroleum ether (boiling point) 60–90°. 4 - [2 - (diallylamino)ethoxy]-4'-bromo-benzophenone was obtained as slightly yellowish crystals of melting point 73–74°.

EXAMPLE 40

20 g. of 4 - (4 - bromobutoxy) - 4' - bromo-benzophenone was dissolved in 50 ml. of diethylamine and heated under reflux conditions for 4 hours. The reaction mixture was subsequently evaporated. The residue was treated with 3-N caustic soda and ether. The ether layer was separated, washed with caustic soda and water, dried over sodium sulfate and evaporated. The residue was recrystallized from petroleum ether (boiling range 60 to 90° C.) 4 - [4 - (diethylamino)butoxy] - 4' - bromobenzophenone of melting point 68 to 69° C. was obtained.

The 4 - (4 - bromobutoxy) - 4' - bromo-benzophenone used as starting product was manufactured as follows:

20 g. of 4-hydroxy - 4' - bromo-benzophenone, 100 ml. of dioxane and 75 ml. of 1-N caustic soda were mixed and treated dropwise within 10 minutes with 40 g. of 1,4-dibromobutane. The mixture was then heated at 90° C. with stirring for 2 hours. The cooled reaction mixture was taken up in ether. The ether extract was washed with 1-N caustic soda and water, dried over sodium sulfate and evaporated. The residue was crystallized from petroleum ether (boiling range 60 to 90° C.). 4 - (4 - bromo-butoxy) - 4' - bromobenzophenone having a melting point of 103 to 104° C. was obtained.

EXAMPLE 41

13.8 g. of 4 - hydroxy - 4' - bromo-benzophenone, 7 g. of diethyl carbonate, 7 g. of 3-diethylaminopropanol and 0.1 g. of potassium carbonate were introduced into a stirring flask which was connected with a descending condenser via a 20 ml. Vigreux column. The reaction mixture was heated to 180° C. internal temperature, with stirring, so slowly that the temperature at the head of the column did not exceed 90° C., and was subsequently stirred at 180° C. for 2 hours. The cooled mixture was taken up in ether. The ether extract was washed with 1-N caustic soda and water, dried over sodium sulfate and evaporated. The residue was crystallized from petroleum ether (boiling range 60° to 90° C.). 4 - 3 - (diethylamino)proproxy]-4'-bromo-benzophenone of melting point 66° to 67° C. was obtained.

What is claimed is:

1. A compound of the formula

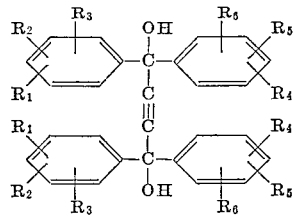

in which $R_1$ is (di-lower alkyl amino)-lower alkoxy; $R_2$, $R_3$ and $R_4$ are each independently selected from the group consisting of hydrogen, lower alkyl and halogen; $R_5$ represents hydrogen, lower alkyl, lower alkoxy, halogen, nitro or (di-lower alkyl)amino; and $R_6$ represents hydrogen, lower alkyl, lower alkoxy, halogen, di-lower alkyl amino or (di-lower alkyl)amino-lower alkoxy, nitro, (N-lower alkyl-N-lower alkenyl-amino)-lower alkoxy or (di-lower alkenyl amino)-lower alkoxy and acid addition salts thereof.

2. A compound according to claim 1 having the formula

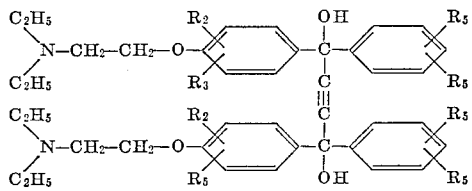

wherein $R_2$, $R_3$ and $R_5$ have the same meaning as in claim 1.

3. A compound according to claim 2 wherein $R_2$ and $R_3$ are each independently selected from the group consisting of hydrogen, methyl and chlorine; $R_5$ is fluorine, bromine, chlorine, or nitro; and $R_6$ is hydrogen or nitro.

4. The compound of claim 3 wherein said compound is 1,4-bis-[p-(diethylamino-ethoxy) - m - tolyl]-1,4-bis-(m-chloro-phenyl)-2-butyne-1,4-diol.

5. The compound of claim 3 wherein said compound is 1,4-bis-[p-(diethylamino-ethoxy)-phenyl] - 1,4 - bis-(m-chloro-phenyl)-2-butyne-1,4-diol.

6. The compound of claim 3 wherein said compound is 1,4-bis-[p-(diethylamino-ethoxy)-phenyl] - 1,4 - bis-(m-fluoro-phenyl)-2-butyne-1,4-diol.

7. The compound of claim 3 wherein said compound is 1,4-bis-[p-(diethylamino-ethoxy)-phenyl]-1,4 - bis - (p-nitro-phenyl)-2-butyne-1,4-diol.

8. The compound of claim 3 wherein said compound is 1,4-bis-[p - (diethylamino - ethoxy)-phenyl]-1,4-bis-(o-nitro-p-chloro-phenyl)-2-butyne-1,4-diol.

9. The compound of claim 3 wherein said compound is 1,4-bis-[p-(diethylamino-ethoxy)-phenyl]-1,4 - bis - (p-bromo-phenyl)-2-butyne-1,4-diol.

10. The compound of claim 1 wherein said compound is 1,4-bis-[p-(diethylamino - ethoxy)-o,o'-dimethyl-phenyl]-1,4-bis-(o,p-dichloro-phenyl)-2-butyne-1,4-diol.

References Cited

UNITED STATES PATENTS

| | | | |
|---|---|---|---|
| 2,411,664 | 11/1946 | Miescher et al. | 260—570.6 |
| 2,584,429 | 2/1952 | Croxall et al. | 360—570.6 XR |
| 2,879,294 | 3/1959 | Campbell | 260—570 |
| 2,891,957 | 6/1959 | Allen et al. | 260—570 XR |
| 2,914,562 | 11/1959 | Allen et al. | 260—570 |
| 2,957,006 | 10/1960 | Arnold et al. | 260—570 XR |
| 3,007,935 | 11/1961 | Bencze | 260—570 XR |
| 3,086,021 | 4/1963 | Biel | 260—570 XR |
| 3,244,705 | 4/1966 | Palopoli et al. | 360—570 XR |
| 3,247,252 | 4/1966 | Palopoli et al. | 260—570 |

FOREIGN PATENTS

| | | |
|---|---|---|
| 182,391 | 6/1955 | Austria. |
| 749,156 | 5/1956 | Great Britain. |
| 1,005,067 | 3/1957 | Germany. |
| 16,883 | 9/1963 | Japan. |

OTHER REFERENCES

Teterin et al., Chem. Abs. vol. 31, p. 8503[5] (1937).
Merrell, Chem. Abstr., vol. 54, p. 8740 (1960).
Copp et al., Chem. Abstra., vol. 59, pp. 1531–1532 (1965).

FLOYD D. HIGEL, Primary Examiner

U.S. Cl. X.R.

260—501.18, 567.6, 459, 591, 519, 465, 476, 584, 583; 424—316, 325, 329

PO-1050
(5/69)

UNITED STATES PATENT OFFICE
CERTIFICATE OF CORRECTION

Patent No. 3,494,961  Dated  February 10, 1970

Inventor(s)  Ruegg, Ryser and Schwieter  Page 1

It is certified that error appears in the above-identified patent and that said Letters Patent are hereby corrected as shown below:

Column 23       Claim 2       Line 41

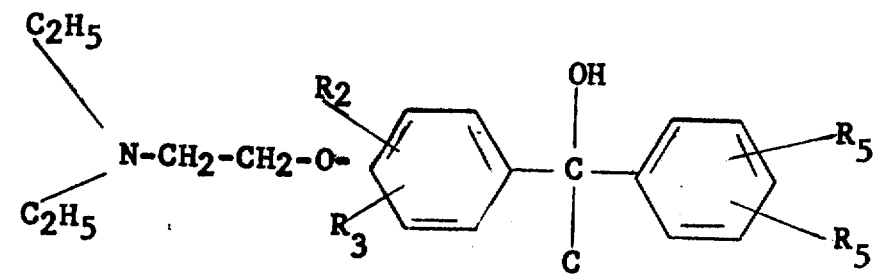

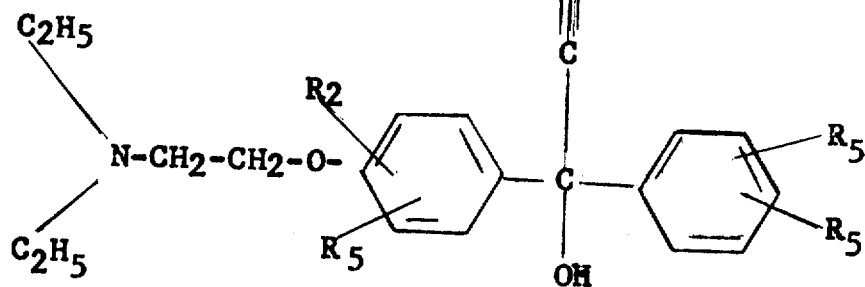

SHOULD BE

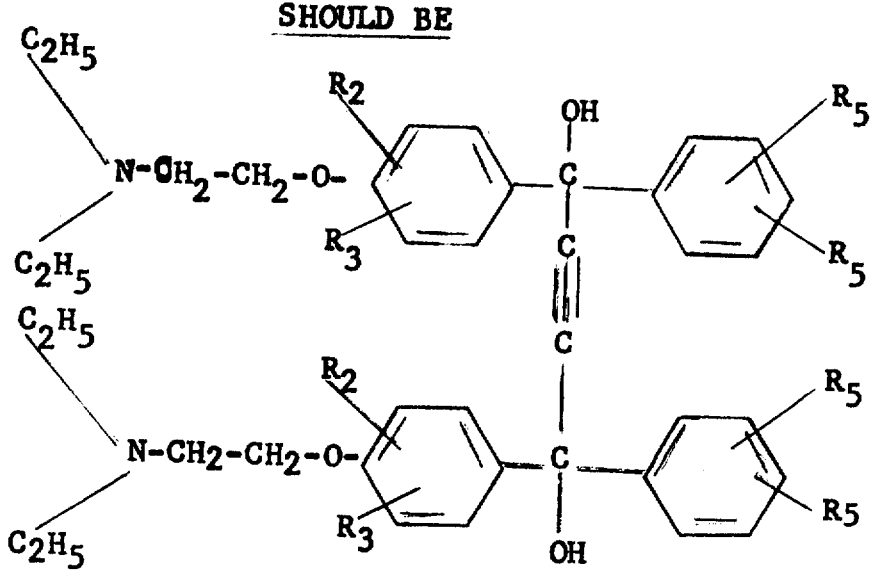

UNITED STATES PATENT OFFICE
CERTIFICATE OF CORRECTION

Patent No. 3,494,961          Dated February 10, 1970

Inventor(s) Ruegg, Ryser and Schwieter    (Page 2)

It is certified that error appears in the above-identified patent and that said Letters Patent are hereby corrected as shown below:

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents

FORM PO-1050 (10-69)